(12) United States Patent
Pento et al.

(10) Patent No.: US 10,956,866 B2
(45) Date of Patent: Mar. 23, 2021

(54) METHOD AND SYSTEM FOR PROVIDING ELECTRONIC CUSTOMS FORM

(75) Inventors: Louie F. Pento, Staten Island, NY (US); Daniel S. Stirewalt, Brooklyn, NY (US); John T. Edgar, Alexandria, VA (US); Robert L. Otto, Stafford, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 969 days.

(21) Appl. No.: 12/212,404

(22) Filed: Sep. 17, 2008

(65) Prior Publication Data

US 2009/0210243 A1 Aug. 20, 2009

Related U.S. Application Data

(62) Division of application No. 10/953,357, filed on Sep. 30, 2004, now Pat. No. 7,818,266.
(Continued)

(51) Int. Cl.
| | |
|---|---|
| *G06Q 10/10* | (2012.01) |
| *G06Q 10/08* | (2012.01) |
| *G06Q 30/02* | (2012.01) |

(52) U.S. Cl.
CPC ............ *G06Q 10/10* (2013.01); *G06Q 10/08* (2013.01); *G06Q 10/0831* (2013.01); *G06Q 30/0281* (2013.01)

(58) Field of Classification Search
CPC ...... G06Q 10/087; G06Q 10/06; G06Q 10/08; G06Q 10/10; G06Q 20/203;
(Continued)

(56) References Cited

U.S. PATENT DOCUMENTS

| 6,040,920 A | 3/2000 | Ichiriki |
| 2002/0065677 A1 | 5/2002 | Grainger et al. |

(Continued)

FOREIGN PATENT DOCUMENTS

| WO | WO 99/41700 | * 8/1999 | ............... G06F 7/10 |
| WO | WO 00/65509 A2 | 11/2000 | |

OTHER PUBLICATIONS

Giermanski, James R. "Update on the North American Trade Automation Prototype." Logistics Management and Distribution Report 37.3 (1998): 92.*

(Continued)

*Primary Examiner* — Michael P Harrington
(74) *Attorney, Agent, or Firm* — Finnegan, Henderson, Farabow, Garrett & Dunner LLP

(57) ABSTRACT

Methods and systems are provided for creating and processing an electronic customs declaration manifest. These methods and systems include creating a image of the customs declaration form, converting the image of the customs declaration form into an electronic customs manifest, and transferring the electronic customs manifest to a database. In addition, a image is may also be forwarded electronically to a remote encoding center, where the customs declaration form data is manually converted into an electronic file for storing in a database. Customs services of both the originating and destination countries review the declared information stored in the database. When the international mailpiece arrives at the border, domestic customs service may find a matching unique identifiers on the international mailpieces and customs declaration forms stored in the database. The service provider may load an international mailpiece into an airplane, if a domestic customs service allow the international mailpiece having a matching unique identifier to leave the originating country. A service provider may return an international mailpiece to the domestic customs (Continued)

service if an international mailpiece is not allowed to leave the originating country.

17 Claims, 4 Drawing Sheets

Related U.S. Application Data

(60) Provisional application No. 60/549,566, filed on Mar. 4, 2004.

(58) Field of Classification Search
CPC ........... G06Q 30/0635; G06Q 10/0833; G06Q 10/0875; B07C 7/005
See application file for complete search history.

(56) References Cited

U.S. PATENT DOCUMENTS

| | | | |
|---|---|---|---|
| 2002/0077915 A1* | 6/2002 | Goto et al. ..................... 705/22 |
| 2003/0075602 A1 | 4/2003 | Wike et al. |
| 2003/0093389 A1 | 5/2003 | Critelli et al. |
| 2003/0125835 A1 | 7/2003 | William et al. |
| 2003/0160095 A1* | 8/2003 | Segal ................ G06F 17/30011 235/375 |
| 2003/0167240 A1* | 9/2003 | Napier et al. ................. 705/404 |
| 2003/0195815 A1 | 10/2003 | Li et al. |
| 2003/0236680 A1 | 12/2003 | Holoubek |
| 2004/0193435 A1* | 9/2004 | Fang ................................. 705/1 |
| 2006/0122843 A1* | 6/2006 | Lin et al. ......................... 705/1 |
| 2006/0145812 A1* | 7/2006 | Sajkowsky ................. 340/5.81 |

OTHER PUBLICATIONS

Hill, S. (1996). The 'virtual' corporation. Manufacturing Systems, 14(3), 32. Retrieved from https://dialog.proquest.com/professional/docview/205951675?accountid=131444 (Year: 1996).*

Holstege, S. (Jan. 5, 2004). Protecting the port of oakland a rising concern ; shipping industry seen as top target for terrorists. Oakland Tribune Retrieved from https://dialog.proquest.com/professional/docview/351905729?accountid=131444 (Year: 2004).*

International Search Report and Written Opinion, dated Mar. 8, 2006, for International application No. PCT/US04/31958.

Chinese Office Action (3$^{rd}$ Notification of Office Action) dated Apr. 21, 2015, by the Chinese Patent Office in Application No. 200480042953.9 (9 pp.).

Canadian Office Action dated Feb. 17, 2015, issued in Application No. 2,558,609 (4 pages).

Chinese Office Action (4th Notification of Office Action) dated Oct. 30, 2015, by the State Intellectual Property Office of China in Application No. 200480042953.9 (10 pages).

Canadian Office Action dated Dec. 8, 2015, by the Canadian Intellectual Property Office in Application No. 2,558,609 (4 pages).

Canadian Office Action dated Nov. 24, 2016, by the Canadian Intellectual Property Office in Application No. 2,558,609 (5 pages).

* cited by examiner

METHOD AND SYSTEM FOR PROVIDING ELECTRONIC CUSTOMS FORM

This application is a division of U.S. application Ser. No. 10/953,357, filed Sep. 30, 2004, which claims priority to U.S. Provisional Application No. 60/549,566, filed Mar. 4, 2004 The contents of the above-referenced applications are hereby incorporated by reference into this application as if set forth herein in full.

TECHNICAL FIELD

This invention relates generally to providing customs declaration forms in an electronic format.

BACKGROUND

Millions of consumers mail letters, packages, and other mailpieces worldwide daily. An international mailpiece generally may not leave the sending country until the appropriate customs service reviews the customs declaration form itemizing the mailpiece's contents and its declared value. Similarly, an international mailpiece may not enter the destination country until the customs declaration form is reviewed by the customs service in that country. Today, to send a mailpiece internationally, depending on the type of international mailpiece and the declared value of its contents, the sender must fill out one of the available paper customs declaration forms. That paper form, affixed to the mailpiece, must then be reviewed by the customs services of the sending and destination countries.

Each time a mailpiece crosses a country's border, the customs service of that country may screen its contents. The customs service may perform that screening by opening and visually inspecting the contents of the mailpiece. More often, however, the customs service simply reviews the disclosure form, such as the customs declaration form, prepared by the sender of the international mailpiece. Typically, the customs declaration form lists all the items enclosed in the mailpiece and their declared value.

Currently, most customs declaration forms designed for consumer use are in paper form. Once a consumer fills out a customs declaration form, one copy may be stored by the service provider in archives and another copy may be stored by the customs service of the country from which the mailpiece is sent. A third copy, typically attached to the international mailpiece itself, may need to be examined twice. The first time, the customs declaration form may be examined prior to the international mailpiece leaving the sending country by its customs service. The customs declaration form may also be examined a second time prior to delivery of the international mailpiece by the customs service of the destination country.

The review of a paper-based customs declaration form by two customs services significantly increases the delivery time of international mailpieces. As is well known in the art, delivery of an international mailpiece may take up to six weeks. For example, an international mailpiece mailed via airmail service or economy mail service offered by a service provider, such as the United States Postal Service (USPS), may be in transit for four to six weeks.

In addition, because of the significant volume of international mail, customs services may need to review millions of customs declaration forms on a daily basis. And, to review customs declaration forms, customs service personnel may need to travel to the shipping and receiving sites of service providers where international mailpieces arrive for further routing. The review process may be further slowed due to the need for customs service personnel to handle each international mailpiece individually.

It is therefore desirable to provide methods and systems for creating and maintaining customs declaration forms in an electronic format enabling paperless and expedient forwarding, review, search, and storage via digital means, such as with a computer-based network.

SUMMARY OF THE INVENTION

Consistent with the invention, methods and systems are provided that include creating an image of the customs declaration form, converting the image of the customs declaration form into an electronic customs manifest, transferring the electronic customs manifest to a database, forwarding a paper copy of the customs declaration form to storage, and scanning a unique identifier on the customs declaration form attached to the international mailpiece. Additionally, these methods and systems include finding a match between the unique identifier on the customs declaration form attached to the international mailpiece and the unique identifier of one of the electronic customs manifests stored in the database.

After the electronic customs manifest is reviewed, if the customs service allows the international mailpiece having the matching unique identifier to leave the originating country, the service provider may load the international mailpiece into an airplane. If that customs service does not allow the international mailpiece having the matching unique identifier to leave the originating country, the service provider will return the international mailpiece to the originating customs service for further inspection and processing.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

To enable mail processing equipment to process customs declaration forms together with other mailpieces processed by a service provider, a customs declaration form may be designed to have a shape of a standard letter. For example, a customs declaration form may have a width, height, and thickness conforming to the width, height, and thickness of typical letters that mail processing equipment processes. For example, a customs declaration form may be approximately 6⅛" high, 10½" wide and 0.2" thick. Other sizes may be used as appropriate.

Figure 1:
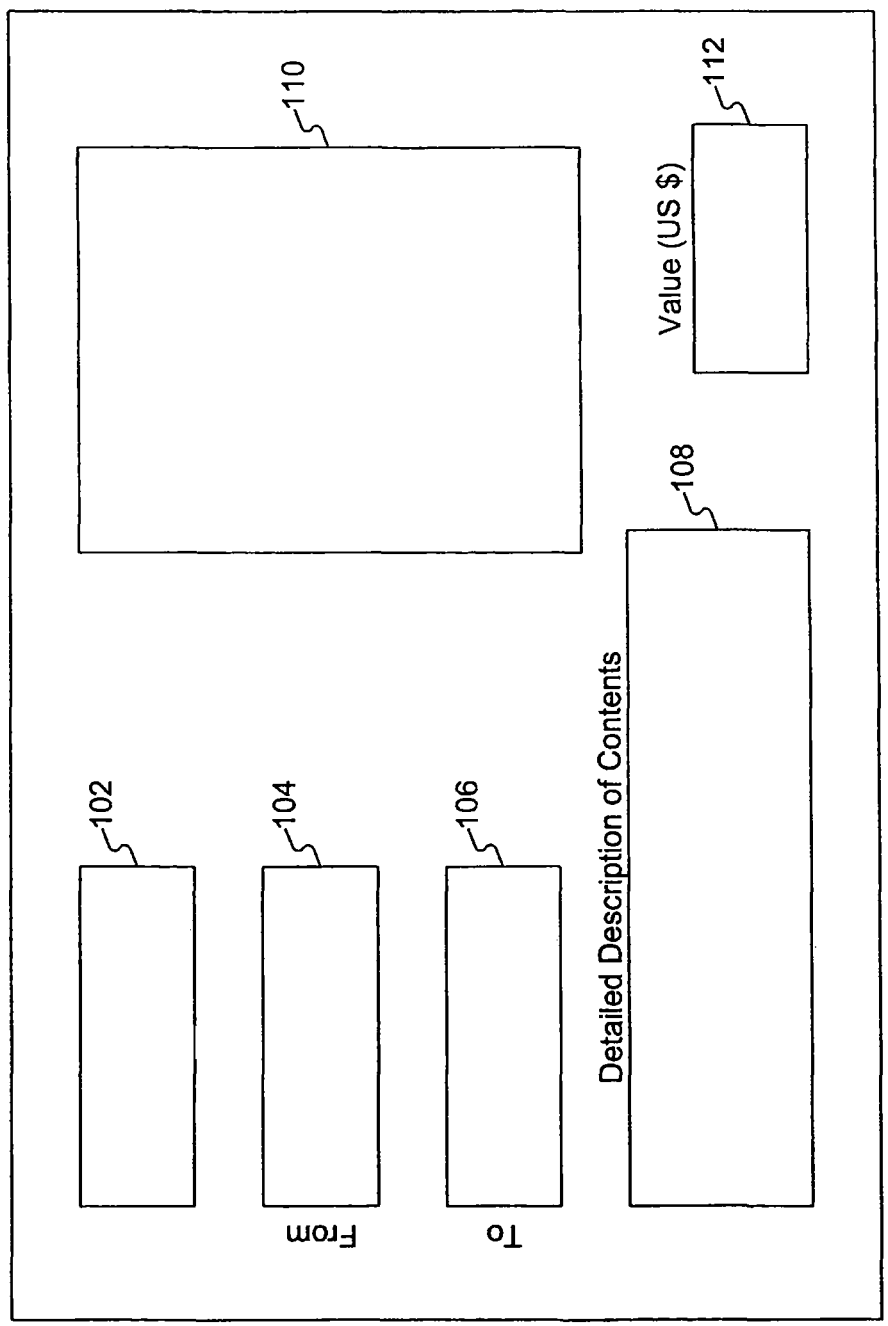
FIG. 1 is an exemplary customs declaration form, consistent with the invention.

As well known in the art, having customs declaration form information in paper form may significantly slow the speed of international shipping. To facilitate high-speed delivery of international mailpieces, a service provider may want to convert information captured in a customs declaration form into an electronic or digital format. FIG. 1 depicts an exemplary customs declaration form 100 designed to facilitate such conversion.

As shown in FIG. 1, customs declaration form 100 may have a unique identifier area 102. The location, type, and size of unique identifier area 102 within the face of customs declaration form 100 may be governed by international standards. As is well known in the art, the international standards dictating the location of a unique identifier on the customs declaration form may be the result of international negotiations between countries exchanging mail. Another requirement for location, type, and size of unique identifier area 102 may be dictated by the equipment used to take an image of customs declaration form 100 or scan unique identifier area 102, as described below.

A unique identifier may be any type of code capable of carrying data, such as, for example, a barcode. The unique identifier should preferably be easily scannable. For example, a barcode may be easily generated, printed and subsequently scanned by commercially available barcode scanner devices. Referring back to FIG. 1, unique identifier area 102 may carry information with several international mailpiece attributes. For example, unique identifier area 102 may include information providing the code of the originating country or information enabling mail processing equipment to recognize the mailpiece as a customs declaration form. For example, unique identifier area 102 may consist of barcode information with thirteen characters. The first two characters may be the letters "CP," identifying the mailpiece as a customs declaration form. The next nine characters may represent a unique sequential number designed to uniquely identify each customs declaration form. The last two characters may be the letters "US" identifying the United States, for example, as the country where the customs declaration form originated. As a person skilled in the art will recognize, unique identifier area 102 may contain data reflecting other attributes of the customs declaration form, consistent with the present invention.

As shown in FIG. 1, customs declaration form 100 may also list the international mailpiece sender's name and address in "From" box 104. In "To" box 106, customs declaration form 100 may also identify the name and address of the recipient. As is well known in the art, customs declaration form 100 may also include a detailed description of the contents of the international mailpiece in box 108, as well as the value of the contents in box 112. Finally, customs declaration form 100 may also list other information required by the service provider and customs service in another area, box 110. For example, box 110 may contain data related to the insurance of the contents of the international mailpiece or the senders instructions in case the international mailpiece cannot be delivered due to an invalid delivery address.

Figure 2:
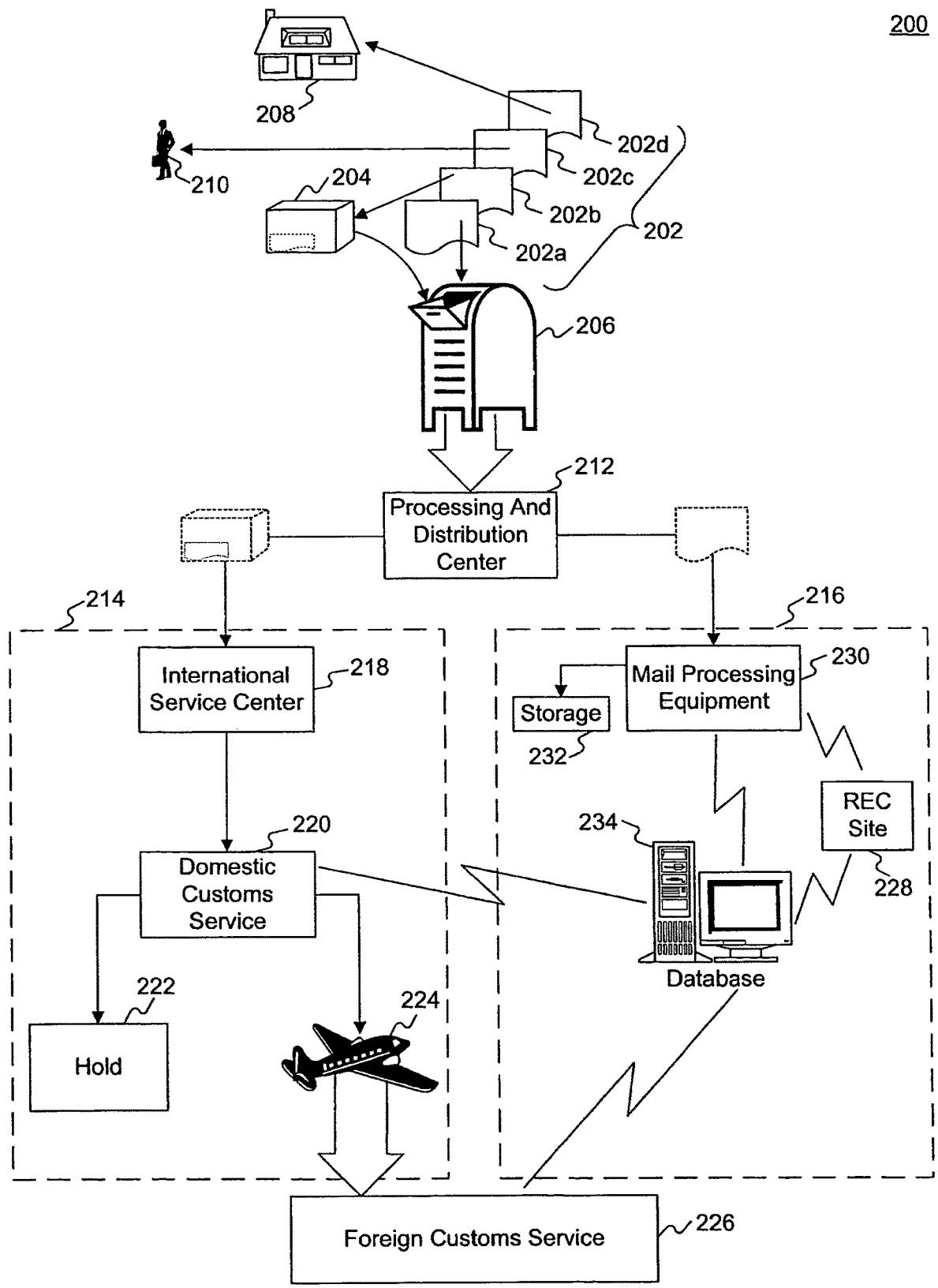
FIG. 2 is a diagram of an exemplary process for a high-speed delivery of an international mailpiece, consistent with the invention.

FIG. 2 is an exemplary process 200 for expedited high-speed delivery of international mailpieces. First, a consumer fills out a customs declaration form 202, shown in FIG. 1. One copy of the completed customs declaration form 202b may be attached to the international mailpiece 204. Then, international mailpiece 204 with the attached copy of customs declaration form 202b may be deposited into the mail stream at, for example, a mailbox 206. Another copy of completed customs declaration form 202a may also be deposited into the mail stream at mailbox 206, separate from international mailpiece 204. After entering the mail stream, both international mailpiece 204 with the attached copy of customs declaration form 202b and the unattached copy of completed customs declaration form 202a may be forwarded for further processing to a processing and distribution center 212. Yet another separate copy of the completed customs declaration form 202d may be kept at a local post office 208. The consumer also may retain a fourth copy of the completed customs declaration form 202c.

After arriving at processing and distribution center 212, international mailpiece 204 with the attached copy of completed customs declaration customs form 202b is sent to its destination to another country via process 214. The unattached copy of completed customs declaration form 202a follows process 216.

To facilitate expedited review of the customs declaration information by the customs services of both the sending and destination countries, the service provider may create a digital file of the information listed on the front of the declaration customs form 202a, as discussed in detail below. Using mail processing equipment 230, a service provider may create a digital file, such as an electronic customs manifest, reflecting information depicted on the paper copy of customs declaration form 202a. One of skill in the art will recognize that mail processing equipment 230 may be any appropriate type of equipment capable of processing mail, such as for example, the Advanced Facer System/input SubSystem (AFCS/ISS). A camera for taking an image of the customs declaration form may be any appropriate camera, for example, a digital or analog camera, capable of taking an image of the front of the customs declaration form. The service provider may install such cameras on its mail processing equipment as necessary to enable the camera to take such images.

If the software of mail processing equipment 230 can not convert information depicted on declaration customs form 202a into a digital file, the service provider may forward the image of customs declaration form 202a to a remote encoding center (REC) site 228. There, the service provider employee may read and manually process information that the software was unable to convert into a digital file. The service provider may also send a paper copy of declaration customs form 202a to storage 232 for future reference.

Once an electronic customs manifest is created, the service provider may forward that electronic customs manifest to a database 234 via a network for further forwarding to a domestic customs service 220 for review. Database 234 may be any appropriate type of database, and may use, for example, proprietary or commercially available software such as an Oracle database. The network may be any appropriate type of network, such as, for example, an internal network (intranet) or a public network (e.g. the internet). Additionally, the network may utilize any suitable type of network protocol.

Having the electronic customs manifest forwarded to domestic customs service 220 within hours after depositing the international mailpiece into the mail stream may decrease the delivery time of the international mailpiece. This may be achieved by providing the domestic customs service of the sending country with the customs declaration information before the corresponding international mailpiece arrives at the border for international shipping. In addition, the service provider may also forward customs declaration form 202a, in the form of an electronic customs manifest, to the customs service 226 of the destination country. By doing so, the service provider can enable the foreign or destination customs service 226 to review the customs declaration information in advance of the arrival of the international mailpiece 204.

In process 214, after the international mailpiece 204 with attached copy of completed customs declaration customs form 202b is separated from non-international mailpieces at processing and distribution center 212, it may be routed for further processing to an international service center 218. After processing international mailpiece 204 at international service center 218, the service provider may forward international mailpiece 204 to domestic customs service 220. By the time the international mailpiece arrives, the domestic customs service 220 may already have reviewed the corresponding customs declaration information contained in the digital file received via network from database 234 and identified mailpieces that should be retained in the sending country at holding facility 222 for additional screening.

More specifically, the domestic customs service may find matching unique identifiers on the international mailpiece and one of the customs manifests stored in the database. Upon finding a match, based on the results of the review of the corresponding electronic customs manifest, the domestic customs service 220 will determine how to process the international mailpiece. For example, the domestic customs service 220 may identify certain international mailpieces as prohibited from leaving the originating country. Upon identifying those international mailpieces, the domestic customs service may return them to the sender or may hold for additional processing. Alternatively, the domestic customs service 220 may have determined, based on the corresponding electronic customs manifest, that the international mailpiece is free to leave the country without further handling or inspection.

To facilitate high-speed shipping of international mailpieces that do not require additional handling or inspection, domestic customs service 220 may forward those international mailpieces for loading onto airplane 224 departing to the destination country. Domestic customs service 220 may also retain international mailpieces requiring special handling by sending them to a holding facility 222 for subsequent individualized inspection. At holding facility 222, after the international mailpieces are inspected individually, the domestic customs service 220 can decide on a case-by-case basis where to forward each inspected international mailpiece. For example, the domestic customs service may send some of the international mailpieces for loading into the airplane 224 while returning others to the senders.

Figure 3:
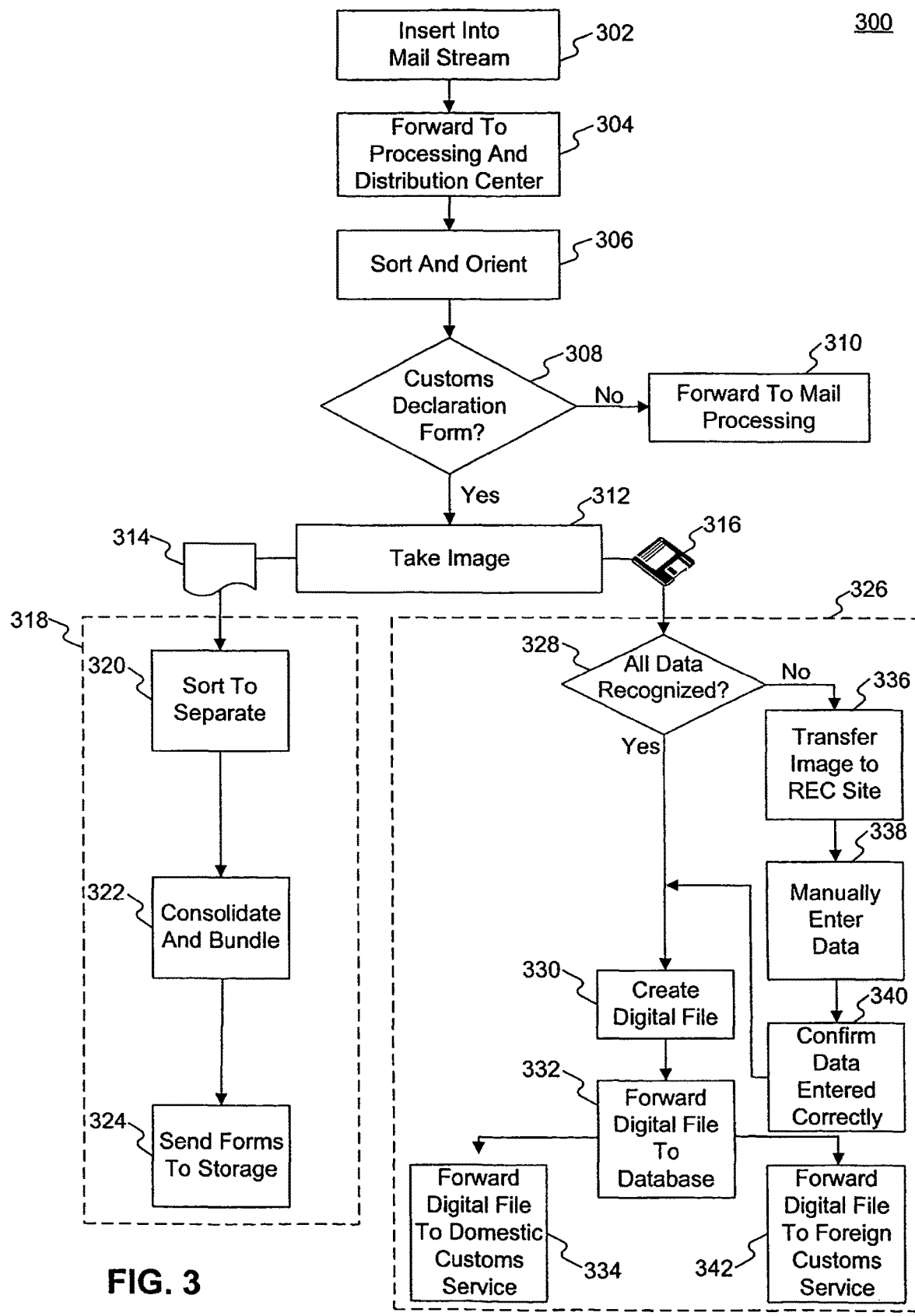
FIG. 3 is a flowchart of an exemplary process for processing a customs declaration form including creating and transferring an electronic customs manifest, consistent with the invention.

FIG. 3 is a flowchart of an exemplary process for processing a customs declaration form including creating and transferring an electronic customs manifest. After a consumer fills out a customs declaration form at step 302, one copy 202a (FIG. 2) may be inserted into the mail stream at, for example, mailbox 206. At step 304, the service provider may then forward the customs declaration form 202a to processing and distribution center 212 for processing. That may be possible because, as described above, customs declaration form 202a may have the form and shape of a regular letter. After customs declaration form 202a arrives at processing and distribution center 212, the service provider may prepare all received letters for processing by mail processing equipment 230. At step 306 the service provider may prepare for processing letters and customs declaration forms received at processing and distribution center 212 by sorting and orienting them in a certain way. For example, the service provider may group all letters of the same size together while keeping them oriented so that lettering on their faces is upside down.

After mail processing equipment 230 receives letters and customs declaration forms, at step 308 it may scan a unique identifier of each individual mailpiece to determine whether the mailpiece is a customs declaration form. If the mail processing equipment 230 determines that the mailpiece is a customs declaration form, at step 312 a mail processing equipment optical device may take an image of the front cover of the customs declaration form. If at step 308 the mail processing equipment 230 determines that the mailpiece is not a customs declaration form, then at step 310 the mail processing equipment forwards the mailpiece for further processing.

The image taken at step 312 by the mail processing equipment 230 may depict all the declaration information provided in the customs declaration form prepared by the sender of the international mailpiece 204 (FIG. 2). Once the image is created, software, such as, for example, Parascript, may convert handwritten or typed data depicted on the image into a digital file 316. As a person skilled in the art will recognize, to convert the image into a digital file, the service provider may use any appropriate software, such as intelligent character recognition (ICR) software capable of recognizing handwriting and converting such data into a digital file. Then, newly created digital file 316 may follow process 326 while a paper copy of customs declaration form 314 that was used for creating that digital file may follow process 318.

To insure the quality of the digital file 316, at step 328 the service provider may confirm whether all the data depicted on the image taken by mail processing equipment 230 was correctly recognized and converted by the software into the digital file 316. The service provider may perform this confirmation using any appropriate commercially available software. If all the data was properly recognized, the service provider may create a digital file, thus creating an electronic customs manifest at step 330.

If not all the data depicted on the customs declaration form was recognized by the software extracting data from the image, at step 336 the service provider may electronically forward the image of the customs declaration form via a network to REC site 228 (FIG. 2). Upon receipt of the image, personnel at REC site 228 may visually examine the image of the customs declaration form and at step 338 manually enter all customs declaration form related information, including identifiers in a unique identifier uniquely identifying the international mailpiece, into a database 234 (FIG. 2). To reduce inevitable errors associated with manual data entry of customs declaration related information, the service provider may at step 340 have its employees confirm the correctness of entered information prior to forwarding the electronic entry to database 234. Once confirmation is completed, all the data depicted on the customs declaration form may be converted into a digital file, an electronic customs manifest at step 330.

After the electronic customs manifest is created at step 330, the service provider may at step 332 forward it to database 234 (FIG. 2). Once database 234 receives the electronic customs manifest in the form of a digital file, at steps 334 and 342 it may be further forwarded via a network to both domestic and foreign customs services, respectively, as discussed above.

At step 320, the service provider may sort paper copies of customs declaration forms to separate them from the rest of non-customs declaration form mailpieces. After that separation is completed, the service provider may consolidate and bundle customs declaration forms at step 332 and then at step 324 forward them to storage 232 (FIG. 2) for archiving.

Figure 4:
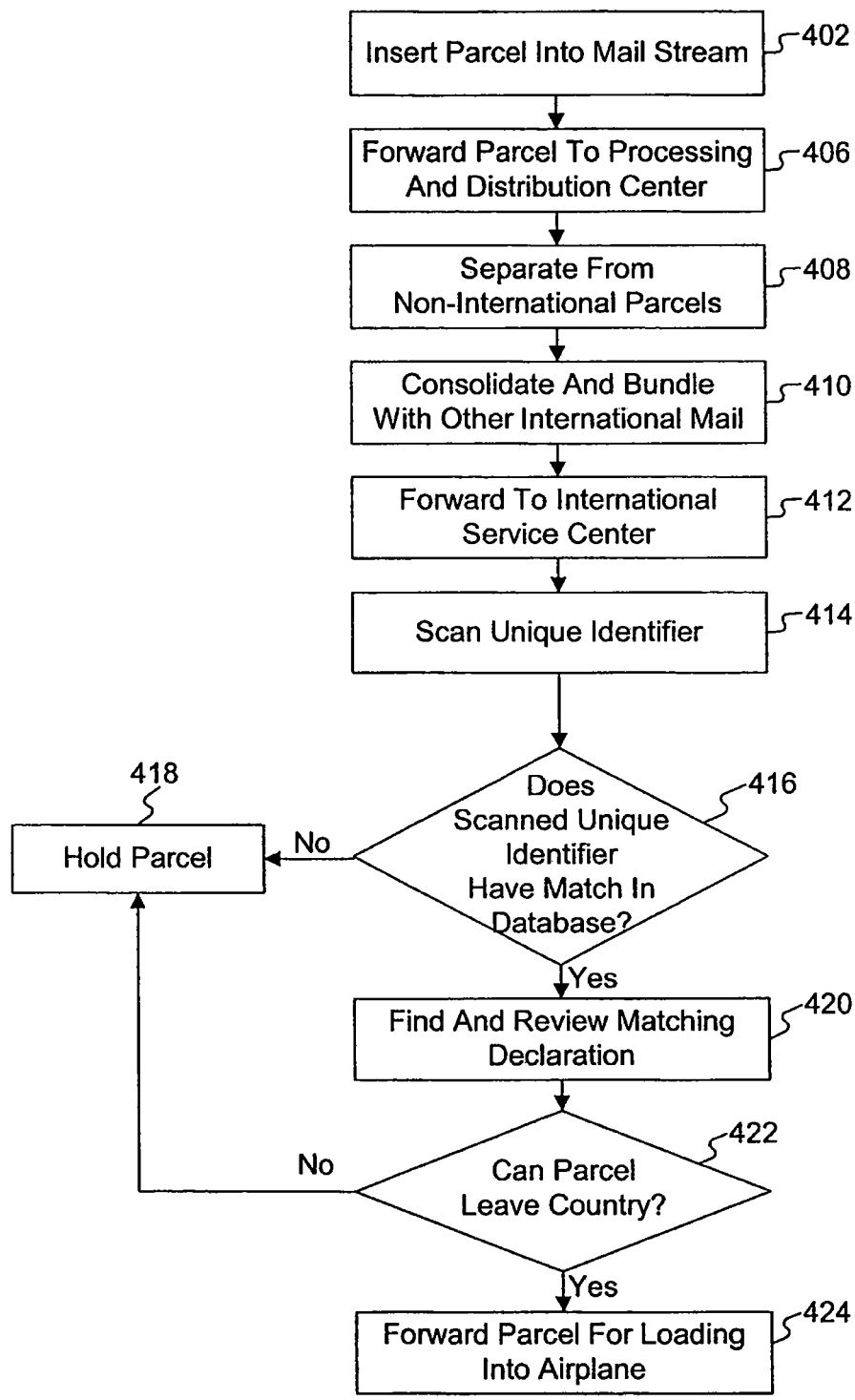
FIG. 4 is a flowchart of an exemplary process for processing an international mailpiece having a customs declaration form attached to it, consistent with the invention.

FIG. 4 is a flowchart of an exemplary process for processing an international mailpiece having a customs declaration form attached to it. After an international mailpiece 204 (FIG. 2), such as a parcel, is inserted into the mail stream (at step 402), the service provider may at step 406 forward the parcel to the processing and distribution center 212, shown in FIG. 2. After the parcel arrives at the processing and distribution center 212, the service provider may separate it from all others mailpieces with domestic destinations at step 408. After the separation, the service provider may consolidate and bundle all international mailpieces (step 410) for further forwarding at step 412 to international service center 218, shown in FIG. 2.

After the international mailpiece arrives at international service center 218, the service provider may scan the unique identifier of the customs declaration form attached to the international mailpiece 204 at step 414. The information in the scanned unique identifier may then be forwarded to database 234 (FIG. 2) to find a matching unique identifier of an electronic customs manifest in step 416. If a matching unique identifier is found, an employee of domestic customs service 220 reviews the corresponding electronic customs manifest at step 420 to confirm that the international mailpiece is permitted to leave the originating country at step 422. If a matching unique identifier is not found in database 234 (FIG. 2), at step 416 the service provider may at step 418 send the international mailpiece to holding facility 222 for further evaluation.

If the employee of domestic customs service 220 determines that an international mailpiece may leave the originating country, the service provider may at step 424 assemble that international mailpiece with other international mailpieces allowed to leave the originating country for subsequent loading into an airplane 224. The service provider may then deliver the international mailpieces to the airport for loading into the airplane 224. If the employee of domestic customs service 220 determines that the international mailpiece may not leave the originating country, the service provider may forward that international mailpiece to holding facility 222 for further evaluation.

In an alternative embodiment, the service provider may perform an additional automated final check and match of international mailpieces with their corresponding electronic custom manifests at the time of loading airplane 224. When international mailpieces arrive at an airplane loading site, the unique identifiers of customs declaration customs forms attached to each international mailpiece may be scanned to confirm that there is permission for the mailpiece to leave the originating country. If it is determined that an international mailpiece may not leave the originating country, the international mailpiece will not be loaded onto the airplane and will instead be forwarded to the mailpiece to holding facility 222 (FIG. 2).

Additionally, in an alternative embodiment, upon unique identifier scanning of international mailpieces being loaded into an airplane, the service provider may forward electronic customs manifests of the international mailpieces to foreign customs service 226. Doing so may provide, for example, an alert to the foreign customs service 226 that certain international mailpieces will be arriving within predetermined period of time, defined by the duration of an airplane flight, and will allow the foreign customs service 226 to perform advanced review of the electronic customs manifests. This may speed delivery in the destination country.

In yet another embodiment, before scanning unique identifiers and finding matches in the database, the domestic customs service 220 may identify and electronically tag all electronic customs manifests whose corresponding international mailpieces require additional inspection or are prohibited from leaving the originating country. These tagged electronic manifests then may be downloaded to scanner devices used by service provider employees. As a result, when the service provider employee scans a unique identifier of the customs declaration form attached to the international mailpiece having corresponding electronic customs manifest that has been tagged, the scanner device may generate a distinct sound. Upon hearing the distinct sound, the employee then will separate the international mailpiece in question for forwarding to domestic custom service 220 for inspection.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for creating and reviewing a customs declaration form, comprising:
receiving a mailpiece at a facility of a service provider of an originating country;
capturing an image of the mailpiece including a first machine-readable barcode representing a first unique identifier, using an optical device;
determining that an electronic customs manifest cannot be converted based on the image of the mailpiece;
after determining that an electronic customs manifest cannot be converted based on the image of the mailpiece, transmitting the image of the mailpiece to a processing device at a remote site via a network;
receiving, via the network, from the processing device at the remote site, an electronic customs manifest converted from the image of the mailpiece;
forwarding the electronic customs manifest to a customs service of the originating country before a first international mail piece with a first attached customs declaration form and a second international mail piece with a second attached customs declaration form arrive at the customs service of the originating country;
transmitting, via the network, to a device associated with a destination country of the mailpiece before the mailpiece arrive in the destination country of the mailpiece, the electronic customs manifest and information indicative of an estimated time period during which the mailpiece will arrive in the destination country;
determining, based on the electronic customs manifest, whether to allow a corresponding international mail piece to leave the originating country without further inspection, before the first international mail piece and the second international mail piece arrive at the customs service of the originating country;
transmitting the electronic customs manifest to a reading device when it is determined that the corresponding international mail piece may not leave the originating country, the electronic customs manifest being stored in the reading device;

reading, using the reading device, a second machine-readable barcode representing a second unique identifier on the first attached customs declaration form that is attached to the first international mail piece;

permitting the first international mail piece to leave the originating country when the second unique identifier does not match the first unique identifier of the electronic customs manifest stored in the reading device;

scanning, by the reading device, a third machine-readable barcode representing a third unique identifier on the second attached customs declaration form that is attached to the second international mail piece;

determining, by the reading device, that the third unique identifier matches the first unique identifier of the electronic customs manifest stored in the reading device; and after determining that the third unique identifier matches with the first unique identifier of the electronic customs manifest stored in the reading device, providing, by the reading device, a sound alert indicating that the second international mail piece may not leave the originating country without further inspection.

2. The method of claim 1, wherein the electronic customs manifest is a digital file.

3. The method of claim 1, wherein the electronic customs manifest converted from the image of the mailpiece is generated based on manual entry of data depicted on the image.

4. The method of claim 1, further comprising forwarding information captured on an unattached copy of the customs declaration form to a database in a digital format.

5. The method of claim 1, further comprising forwarding the electronic customs manifest to a foreign customs service.

6. The method of claim 1, further comprising forwarding a paper copy of the customs declaration form to a storage.

7. The method of claim 1, wherein the image is a digital image.

8. The method of claim 1, further including:

reading the first unique identifier from the first machine-readable barcode on the mailpiece;

determining, using mail processing equipment, whether the mailpiece is a customs declaration form based on information included in the first unique identifier; and capturing the image of the mailpiece only, when the mailpiece is identified as the customs declaration form, the image including the first unique identifier.

9. A system for creating and reviewing a customs declaration form, comprising:

a receiving component configured to receive a mailpiece at a facility of a service provider of an originating country;

mail processing equipment configured to:
read, using a scanner, a machine-readable barcode representing a first unique identifier on the mailpiece; and
determine whether the mailpiece is a customs declaration form based on information included in the first unique identifier;

an imaging component configured to capture an image of the mailpiece when the mailpiece is determined to be the customs declaration form, the image including the first unique identifier;

a conversion component configured to:
determine that an electronic customs manifest cannot be converted based on the image of the mailpiece;
after determining that an electronic customs manifest cannot be converted based on the image of the mailpiece, transmit the image of the mailpiece to a processing device at a remote site via a network; and
receive, via the network, from the processing device at the remote site, an electronic customs manifest converted from the image of the mailpiece;

a forwarding component configured to forward the electronic customs manifest to the customs service of the originating country before a first international mail piece with a first attached customs declaration form and a second international mail piece with a second attached customs declaration form arrive at the customs service of the originating country, wherein the forwarding component is further configured to transmit, via the network, to a device associated with a destination country of the mailpiece before the mailpiece arrive in the destination country of the mailpiece, the electronic customs manifest and information indicative of an estimated time period during which the mailpiece will arrive in the destination country;

a determination component for determining, based on the electronic customs manifest, whether to allow a corresponding international mail piece to leave the originating country without further inspection, before the first international mail piece and the second international mail piece arrive at the customs service of the originating country;

a transfer component configured to transfer the electronic customs manifest to a reading device when it is determined by the determination component that the corresponding international mail piece may not leave the originating country, the electronic customer manifest being stored in a database in the reading device;

a matching component configured to:
scan, using the reading device, a second machine-readable barcode representing a second unique identifier on the first attached customs declaration form that is attached to the first international mail piece;
scan, using the reading device, a third machine-readable barcode representing a third unique identifier on the second attached customs declaration form that is attached to the second international mail piece;
determine that the third unique identifier matches with the first unique identifier of the electronic customs manifest stored in the reading device;
determine that the third unique identifier matches with the first unique identifier of the electronic customs manifest stored in the reading device; and
after determining that the third unique identifier matches with the first unique identifier of the electronic customs manifest stored in the reading device provide a sound alert indicating that the second international mail piece may not leave the originating country without further inspection; and a confirming component for permitting the first international mail piece to leave the originating country when the second unique identifier does not match the first unique identifier of the electronic customs manifest stored in the reading device.

10. The system of claim 9, wherein the electronic customs manifest is a digital file.

11. The system of claim 9, wherein the electronic customs manifest converted from the image of the mailpiece is generated based on manual entry of data depicted on the image.

12. A non-transitory computer-readable medium comprising computer-readable instructions, when executed by at least one processor, configured to perform a method comprising:
- receiving a mailpiece at a facility of a service provider of an originating country;
- capturing an image of the mailpiece including a first machine-readable barcode representing a first unique identifier, using an optical device;
- determining that an electronic customs manifest cannot be converted based on the image of the mailpiece;
- after determining that an electronic customs manifest cannot be converted based on the image of the mailpiece, transmitting the image of the mailpiece to a processing device at a remote site via a network;
- receiving, via the network, from the processing device at the remote site, an electronic customs manifest converted from the image of the mailpiece;
- forwarding the electronic customs manifest to the customs service of the originating country before a first international mail piece with a first attached customs declaration form and a second international mail piece with a second attached customs declaration form arrive at the customs service of the originating country;
- transmitting, via the network, to a device associated with a destination country of the mailpiece before the mailpiece arrive in the destination country of the mailpiece, the electronic customs manifest and information indicative of an estimated time period during which the mailpiece will arrive in the destination country;
- determining, based on the electronic customs manifest, whether to allow a corresponding international mail piece to leave the originating country without further inspection, before the first international mail piece and the second international mail piece arrive at the customs service of the originating country;
- transmitting the electronic customs manifest to a reading device when it is determined that the corresponding international mail piece may not leave the originating country, the electronic customs manifest being stored in the reading device;
- reading, using the reading device, a second machine-readable barcode representing a second unique identifier on the first attached customs declaration form that is attached to the first international mail piece;
- permitting the first international mail piece to leave the originating country when the second unique identifier does not match the first unique identifier of the electronic customs manifest stored in the reading device;
- scanning, by the reading device, a third machine-readable barcode representing a third unique identifier on the second attached customs declaration form that is attached to the second international mail piece;
- determining, by the reading device, that the third unique identifier matches with the first unique identifier of the electronic customs manifest stored in the reading device; and
- after determining that the third unique identifier matches with the first unique identifier of the electronic customs manifest stored in the reading device, providing, by the reading device, a sound alert indicating that the second international mail piece may not leave the originating country without further inspection.

13. The non-transitory computer-readable medium of claim 12, wherein the electronic customs manifest is in a digital format.

14. The non-transitory computer-readable medium of claim 12, wherein the method further comprises forwarding the electronic customs manifest to a foreign customs service.

15. The non-transitory computer-readable medium of claim 12, wherein the method further comprises forwarding a paper copy of the customs declaration form to a storage.

16. The non-transitory computer-readable medium of claim 12, wherein the image is a digital image.

17. The non-transitory computer-readable medium of claim 12, wherein the method further comprises:
- reading the first unique identifier from the first machine-readable barcode on the mailpiece;
- determining, using mail processing equipment, whether the mailpiece is a customs declaration form based on information included in the first unique identifier; and
- capturing the image of the mailpiece only, when the mailpiece is identified as the customs declaration form, the image including the first unique identifier.

* * * * *